United States Patent Office 3,606,572
Patented Sept. 20, 1971

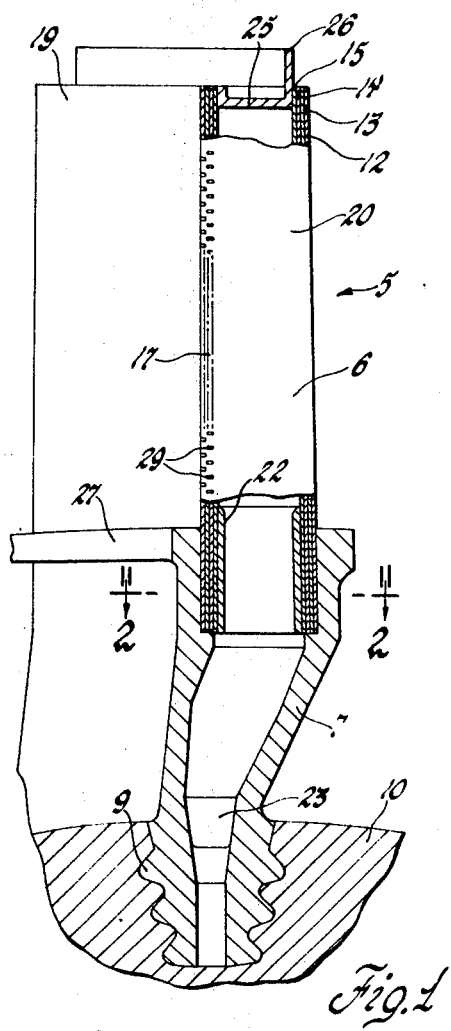

3,606,572
AIRFOIL WITH POROUS LEADING EDGE
Ronald P. Schwedland, Indianapolis, Ind., assignor to General Motors Corporation, Detroit, Mich.
Filed Aug. 25, 1969, Ser. No. 852,555
Int. Cl. F01d 5/08
U.S. Cl. 416—90                          10 Claims

ABSTRACT OF THE DISCLOSURE

A hollow airfoil for use as a turbine vane or blade is made up of a number of sheet metal layers bonded together and folded at the leading edge. Holes for transpiration cooling of the blade are formed in the leading edge, the holes in the successive layers being disposed in spanwise rows with the holes in each layer partially overlapping the holes in the corresponding row in adjacent layers. These holes improve the folding properties of the leading edge. Some of them are connected to conduct air to the forward portion of the porous side walls of the airfoil.

---

The invention herein described was made in the course of work under a contract or subcontract thereunder with the Department of Defense.

DESCRIPTION

My invention is directed to improvements in airfoils such as turbine vanes and blades which are formed from multilayer metal sheets, and is directed specifically to improvements in the leading edge structure of such airfoils such as to facilitate the cooling of the leading edge and make it more feasible to form such laminated sheet metal blades with relatively sharp leading edges from difficultly workable material such as certain high temperature alloys. Hereinafter, the term "blade" will be used generically for blades, vanes, and equivalent devices.

It has been previously been proposed to make a turbine blade wall of a number of layers of sheet metal bonded together, with a structure providing for controlled diffusion of air through the blade wall and out through small openings or pores in the outer surface of the blade. There have been difficulties in forming leading edges of prior art blades and vanes to as small radius as may be desired.

The leading edge structure according to my invention makes it possible to produce a relatively sharp fold at the leading edge without cracking or loss of structural integrity of the laminated and bonded sheet metal, while preserving a structure which provides for flow of air through numerous small holes or pores in the leading edge for transpiration cooling. It may also aid in supplying cooling air to the blade side walls.

The principal object of my invention is to provide improved turbine blades and to facilitate the forming of blades of most desirable aerodynamic configuration from laminated bonded metal sheets. A further object is to improve the provisions for cooling of blades and vanes in high-temperature turbomachines. The invention is illustrated herein as embodied in a turbine blade which may be otherwise generally of the type described and claimed in U.S. patent application Ser. No. 742,900 of Meginnis for Turbine Blade, filed July 5, 1968, of common ownership with this application.

It is well suited to use in blades of structure other than that of the Meginnis application, however. The disclosure of the Meginnis application and applications Ser. No. 691,834 of Emmerson for Turbine Cooling, filed Dec. 19, 1967 and No. 707,556 of Helms for Turbine Blade, filed Feb. 23, 1968 referred to therein may be referred to so far as it may be necessary to an understanding of my invention; however, I believe that the succeeding detailed description of the preferred embodiment of my invention is sufficient without reference to any prior application.

The nature of my invention and the advantages thereof will be clear to those skilled in the art from the accompanying drawings and succeeding detailed description of the preferred embodiment of my invention. The description and drawings are provided for the purpose of explaining the principles of the invention, and not in a limiting sense.

Referring to the drawings, FIG. 1 is an elevation view of a blade on a plane extending spanwise thereof, with parts cut away and in section.

FIG. 2 is a transverse sectional view taken on the plane indicated by the line 2—2 in FIG. 1.

FIG. 3 is a view of the leading edge structure, with parts cut away and in section, illustrating the hole and groove pattern at the leading edge prior to forming.

FIG. 4 is a fragmentary sectional view taken on the plane indicated by the line 4—4 in FIG. 3.

FIG. 5 is a fragmentary axonometric view of a folded blade, with parts cut away and in section.

Referring first to FIG. 1, the turbine blade 5 illustrated comprises an airfoil 6 and a stalk 7 which terminates in a multiple dovetail root 9. The root is illustrated as mounted in a mating slot in a rotor structure or wheel 10. The general contour of the airfoil is best shown in the sectional view of FIG. 2. It is a folded sheet metal structure made up of four layers or laminae of heat resistant metal, these being an outside layer 12, a first interior layer 13, a second interior layer 14, and an inside layer 15. The airfoil has a leading edge at 17 and a trailing edge at 18, the sheet metal being formed to define the leading edge and blade faces or side walls 19 and 20 extending to the trailing edge, at which the two walls are joined to provide a hollow tubular laminated airfoil.

The airfoil is received in a mating recess in the blade stalk, to which it is bonded. A reinforcing layer at 22 is disposed inside the airfoil wall to reinforce it at the junction with the blade stalk. The stalk defines a cooling air passage 23 by which cooling air from a suitable source (not illustrated) is supplied through the blade stalk into the interior of the airfoil.

The outer end of the airfoil is closed by a cast metal plug 25 welded or otherwise fixed in place. This plug includes an outwardly extending lip or flange which may be machined to fit close to the stationary structure of the turbine shroud to provide a barrier to gas flow over the outer end of the blade, and a structure which is readily abradable without damage to the blade in the event of interference between the end of the blade defined by the lip 26 and the stationary shroud.

The blade platform 27 extends laterally from the outer end of the stalk so as to be engaged by platforms of adjacent blades to define the inner boundary of the gas path through the turbine rotor. It is to be understood that other blades are mounted adjacent to the blade shown so as to define a ring of such blades on the rotor 10.

It is preferred that the faces or walls 19 and 20 of the blade be of a material having controlled porosity for transpiration cooling of the blade. However, such a structure of these walls is immaterial in all cases to my invention, which is concerned with the structure at the leading edge 17.

As shown generally in FIG. 3, the outside layer 12 has three spanwise-extending rows of air discharge holes or pores 29, the holes in the center one of the three rows being staggered with respect to the holes in the other two rows. The first interior layer 13 bears five spanwise-extending rows of holes 30. As is clearly apparent in FIG. 3, the holes in adjacent rows are in a staggered or diagonal pattern in this sheet also. The three inner rows of holes 30 underlie the pores 29 and are centered slightly below and overlapping with the holes 29. The two outer rows of holes 30 are blanked off by the overlying outside layer 12, apart from passages leading to the blade faces, to be described.

The second interior layer 14 bears five rows of holes 31 which are in the same disposition as the holes 30 and are preferably approximately the same size and shape. As will be seen from FIGS. 3 and 4, the holes 31 are disposed in echelon to the holes 30 so that they only partially overlap. The inside layer 15 also bears five rows of holes 32 disposed behind holes 31 and in echelon so as to partially overlap the holes 31. The three innermost rows of holes 32 have a diamond shape as shown in FIG. 5 so that after folding the leading edge there will always be at least a small hole left to let the leading edge cooling air out, thus making the design nearly insensitive to forming irregularities which might seal off the air supply.

Thus, the two outermost rows of holes 30, 31, and 32 define a weakened zone collapsible in the three layers inside of the outside layer 12. The three inner rows of holes 32, 31, 30, and the holes 29 define passages extending entirely through the leading edge and directed, in the preferred embodiment, toward the blade tip as they progress from the interior of the blade to the exterior.

The nature of the preferred geometry of these holes will be more clearly apparent from consideration of specific values in a typical embodiment in a turbine blade of about one and four tenths inch chord. The dimensions of this embodiment are given in mils, a mil being a thousandth of an inch. The leading edge radius at the outside of the blade is approximately 56 mils. The spacing spanwise of the blade between the centers of holes in any given row of holes extending spanwise of the blade is 60 mils. The circumferential distance around the leading edge from one spanwise row of holes to the next spanwise row, which is staggered with respect to it, is about 16 mils. Tabulated below are the thicknesses and dimensions of the holes in the sheets and the spanwise offset of the centers of the holes from the centers of the corresponding holes in the outside sheet 12.

| Layer | Thickness | Hole length (spanwise) | Hole width | Offset |
| --- | --- | --- | --- | --- |
| 12 | 6-7 | 11 | 19 | 0 |
| 13 | About 9 | 40 | 19 | 10 |
| 14 | do | 40 | 22 | 30 |
| 15 | 15 | 50 | 25-50 | 50 |

Of course, these values are subject to tolerance variations, and may vary from one design of airfoil to another. It will be noted that the external radius of the leading edge is only about one and one-half times the total thickness of the blade wall material; that is, the sum of the thickness of the four layers.

With the disposition of the holes as shown, the blade can readily be bent to form an acute leading edge radius without cracking of the outer layer or other disruption of the blade wall structure. The holes 30, 31, and 32 will be squeezed partially shut in the direction circumferentially of the leading edge as the blade is folded. However, the possibility of holes 32 becoming completely closed is removed by using diamond shaped holes. These holes leave a nearly constant thickness web between the holes for uniform collapsing. Since, as shown above, these holes are much larger than the outlet holes 29, ample air can get through the holes in the other layers to reach the holes in the outside layer, which normally act as the metering orifices for the cooling air discharged from the blade. In this connection, the two outermost rows of holes in the layers other than the outside layer aid in promoting the ability of the inner sheets to give or be compressed as the radius is formed. Holes 29 are elongated to further reduce the possibility of tearing due to forming the tight radius.

Because of the arrangement in echelon of the holes, the weakness is well distributed through the several layers so that there is no great disuniformity in strength or resistance to the bending or folding operation.

Also, the echelon arrangement of the holes provides for greater circulation of the cooling air through the fabric of the blade wall at the leading edge to absorb heat by convection from the blade wall, in distinction to the action of the air flowing from the blade to provide a film between the blade and the hot motive fluid.

A highly desirable feature of my invention in its preferred embodiment, apart from the arrangement of the holes in the leading edge to facilitate forming and cooling of the leading edge, is embodied in an arrangement to circulate cooling air from the two outermost rows of holes beneath the outside layer to the side walls of the blade adjacent to the leading edge.

If, as preferred, the side walls are of a structure defining coolant paths within and through the walls, through and between the several layers, generally as described and claimed in prior applications, of common ownership with this application, Ser. No. 526,207 of Bratkovich and Meginnis for Laminated Porous Metal, filed Feb. 9, 1966, and Ser. No. 742,900 of Meginnis for Turbine Blade, filed July 5, 1968, the coolant passages between the outside layer 12 and the first interior layer 13 are supplied from the holes 30 through passages 35 (FIGS. 3 and 5) cut into the outer surface of layer 13 and extending away from the leading edge.

This cooling air aids in lowering the temperature of the flanks of the leading edge. Note in FIG. 5 that the first interior layer bears bosses 36 which space it in part from layer 12. Bosses 36 are preferably, but not necessarily, O-shaped, with a central depression, to minimize the amount of metal in the bosses. The outer surface of each boss 36 is bonded to the inner surface of outside layer 12.

Thus, air flowing through the outermost row of holes 32, 31, and 30 at each side of the leading edge is distributed through grooves 35 to the space between layers 12 and 13. Additional air is supplied to this space through holes such as 38, as described in the above-mentioned applications.

The holes in and bosses on the several layers of the blade may be formed in any desired way, preferably by some such process as photoetching, by means of which the location and size of the holes and bosses can be accurately controlled. Also, photoetching is suitable for acting upon materials of a sort suitable for turbine blades. The sheets may be joined together by diffusion bonding, for instance. The details of such processes are immaterial to my invention, which lies in the improved structural arrangement described.

However, it may be pointed out that the generally diamond-shaped outline of holes 32 in the three central rows can be achieved by etching through a resist which has two crossed lines exposing the underlying metal to the etchant. The thickness of the lines admitting the etchant to the metal is a function of the thickness of the metal sheet being etched.

The generally diamond-shaped holes leave an approximately constant metal web between the holes, which resists buckling and cracking of the metal and is highly favorable to forming of certain high temperature alloys including René 41.

It is to be understood that the detailed description of the preferred embodiment is merely for the purpose of explaining the invention, which is subject to variation by the exercise of skill in the art.

What is claimed is:

1. A hollow sheet metal turbine blade or vane comprising an airfoil defined by a plural number of sheet metal layers bonded together and having a small-radius fold at the leading edge of the airfoil, the leading edge having an outside layer, an inside layer, and one or more interior layers disposed between the outside and inside layers, each layer having a plural number of spanwise-extending rows of coolant holes at the leading edge of the airfoil for discharge of cooling fluid from within the airfoil out of the leading edge, the coolant holes in each row in successive layers being disposed in echelon spanwise of the blade with the holes in each layer partially overlapping the holes of each adjacent layer.

2. A structure as defined by claim 1 in which the holes in adjacent rows of each layer are staggered.

3. A structure as defined by claim 1 in which the holes in the outside layer are smaller than those in the other layers before the leading edge is folded.

4. A structure as defined by claim 1 in which, prior to folding, some of the holes are of a generally diamond-shaped configuration.

5. A structure as defined by claim 1 in which some of the holes are of such outline as to leave substantially constant-width strips of metal between the said some holes.

6. A structure as defined by claim 5 in which the said some holes are in the inside layer.

7. A hollow sheet metal turbine blade or vane comprising an airfoil defined by a plural number of sheet metal layers bonded together and having a small-radius fold at the leading edge of the airfoil, the leading edge having an outside layer, an inside layer, and one or more interior layers disposed between the outside and inside layers, each layer having a plural number of spanwise-extending rows of coolant holes at the leading edge of the airfoil for discharge of cooling fluid from within the airfoil out of the leading edge, the coolant holes in each row in successive layers being disposed in echelon spanwise of the blade with the holes in each layer partially overlapping the holes of each adjacent layer, the interior and inside layers having an additional spanwise-extending row of holes through those layers at one side of the above-specified rows of coolant holes, the outside layer overlying the additional holes so as to block direct discharge of cooling fluid from the holes of the additional row.

8. A structure as defined by claim 7 having a said additional row of holes at each side of the rows of coolant holes.

9. A structure as defined by claim 7 including means defining passages between the layers connecting to the additional rows of holes in the interior layers and extending away from the leading edge.

10. A structure as defined by claim 7 in which the airfoil has porous side walls, and including passages between the said layers connecting some of the said additional holes in the interior layers to the porous side walls.

References Cited
UNITED STATES PATENTS 3,067,982   12/1962   Wheeler _____ 416—90
3,411,794   11/1968   Allen _____ 416—95UX EVERETTE A. POWELL, Jr., Primary Examiner U.S. Cl. X.R.
416—97, 231